United States Patent [19]

Geller et al.

[11] 3,913,125

[45] Oct. 14, 1975

[54] NEGATIVE IMPEDANCE CONVERTER

[75] Inventors: William L. Geller; Jeremiah P. McCarthy, both of Framingham, Mass.

[73] Assignee: GTE Laboratories Inc., Waltham, Mass.

[22] Filed: Oct. 23, 1974

[21] Appl. No.: 515,116

Related U.S. Application Data

[62] Division of Ser. No. 369,043, June 11, 1973.

[52] U.S. Cl. ...................... 357/46; 357/40; 357/48; 357/44; 357/51; 357/57; 307/299 B; 307/324

[51] Int. Cl.² .................. H01L 27/02; H01L 29/66; H01L 27/04

[58] Field of Search ........... 307/299 B, 324; 357/40, 357/46, 48, 51, 44, 57

[56] References Cited

UNITED STATES PATENTS 3,309,537 3/1967 Archer .............................. 307/88.5

3,712,995 1/1973 Steudel .............................. 307/304

*Primary Examiner*—Martin H. Edlow

*Attorney, Agent, or Firm*—Irving M. Kriegsman; Leslie J. Hart

[57] ABSTRACT

A semiconductor negative impedance converter device for compensation of insertion losses attributable to the use of high impedance devices such as semiconductor controlled rectifiers in solid state telephone switching networks. The device comprises a double collector PNP transistor and an NPN transistor which can be fabricated in a single semiconductor substrate without the need for isolation of their various regions.

5 Claims, 3 Drawing Figures

NEGATIVE IMPEDANCE CONVERTER

This is a division, of application Ser. No. 369,043 filed June 11, 1973.

FIELD OF THE INVENTION

This invention relates to a semiconductor negative impedance amplifier and, more specifically, to a semiconductor negative impedance converter device particularly adaptable for use in telephone switching networks.

BACKGROUND OF THE INVENTION

In many switching applications, such as in a telephone central office switching network, a transmission path is provided between given input and output lines by selectively establishing crosspoint connections in the switching network. Such a switching network typically includes a plurality of switching matrices between groups of input and output lines, each stage containing one or more switching matrices. In some switching networks, the matrices are interconnected to provide a plurality of paths between each line in the input line group and each line in the output line group, while other switching networks provide a unique path between any given line in the input line group and any given line in the output line group.

The use of solid state devices such as semiconductor controlled rectifiers for line switching applications is of increasing importance in communications systems. These devices, however, have a relatively high impedance as compared with electromechanical switches and introduce significant insertion loss in the signal path. Compensation for the high insertion losses is normally required for each line of a switching system requiring a large number of negative impedance amplifiers for each line. Therefore, the principal object of this invention is to provide a negative impedance amplifier to compensate to compensate for the high insertion losses in a solid state communications network.

A further object is to provide a negative impedance converter which can be conveniently and inexpensively fabricated on a single semiconductor substrate with a minimum number of components.

SUMMARY OF THE INVENTION

The present invention is directed to a semiconductor negative impedance converter device which may be utilized to compensate for high impedance devices used in a solid state line switching application in communications systems. This converter is fabricated in a single semiconductor substrate without the need for isolation of its individual regions.

In accordance with the present invention there is provided a negative impedance converter module which comprises a semiconductor substrate of a first conductivity type having first, second, and third spaced regions of a second conductivity type formed therein. A fourth region of the first conductivity type is formed within the third region. First, second, third, and fourth spaced electrodes conductively contact each of the first, second, third and fourth regions, respectively. An insulating layer overlies and is in contact with the substrate in the areas between first, second, and third regions. Optionally, a fifth region of the second conductivity type may be formed in the semiconductor substrate to function as a base diffused resistor. A fifth spaced electrode conductively contacts the fifth region and may be electrically connected to the third and fourth regions by an electrically conductive overlay on the insulating layer. A second resistive element external to the substrate is connected between the second and third electrodes. The negative impedance converter comprises various transistor elements as well as one of the resistive components which are built up from a single semiconductor substrate. The substrate contains a double collector PNP transistor, an NPN transistor and an optional resistive element. The device, therefore, performs the function of providing a negative impedance amplifier with solid state operation. The device may be fabricated using standard silicon technology requiring the same number of process steps as a simple planar NPN transistor process.

In operation a current is passed through the device from the first to the second electrode. Initially, this current flows through the resistive components of the device, the transistors being cut off. At some predetermined value of current, $I_1$, the NPN transistor will begin to conduct providing base drive for the double collector PNP transistor. In the current range from O to $I_1$, the device exhibits a positive resistance characteristic. As the applied current increases beyond the $I_1$ value, it is split into two paths by means of the double collector PNP transistor which has now been placed into conduction by the NPN transistor. One of the two PNP collectors is the base region of the NPN transistor thereby forming a regenerative loop. The other PNP collector is returned to the second terminal of the device.

Since one collector of the PNP is in a regenerative loop with the NPN transistor, the device will exhibit a negative incremental resistance. This means that a further increase in current results in a decrease in the terminal voltage of the device. As the amount of current increases to a second predetermined value, $I_2$, the current through the first PNP collector will be sufficient to drive the NPN into saturation and the device will again exhibit a positive resistance characteristic for further increases in current. Only the current in one of the two collectors drives the NPN. The current in the other collector flows directly into the second terminal of the device. The value of current at the second predetermined value $I_2$ is the sum of the currents flowing through the two PNP collectors. The dynamic range and negative resistance value of the device is a function of the ratio of the two PNP collector currents. This property of the device will be made clearer in the more detailed description of the preferred embodiment to follow.

In normal operation, the device is biased with a current such that the circuit operates in the negative resistance region. While operating in this region, the device acts as a negative impedance converter. The magnitude of the negative resistance of the device is determined by the resistance components as well as the collector current ratio in the double collector PNP transistor.

The features of the present invention which are believed to be novel are set forth with particularity in the attendant claims. The invention, together with further objects and advantages thereof, may best be understood by reference to the following description taken in connection with the drawings. In the several figures, like reference numerals identify like elements.

DESCRIPTION OF THE PREFERRED EMBODIMENT

Figure 1:
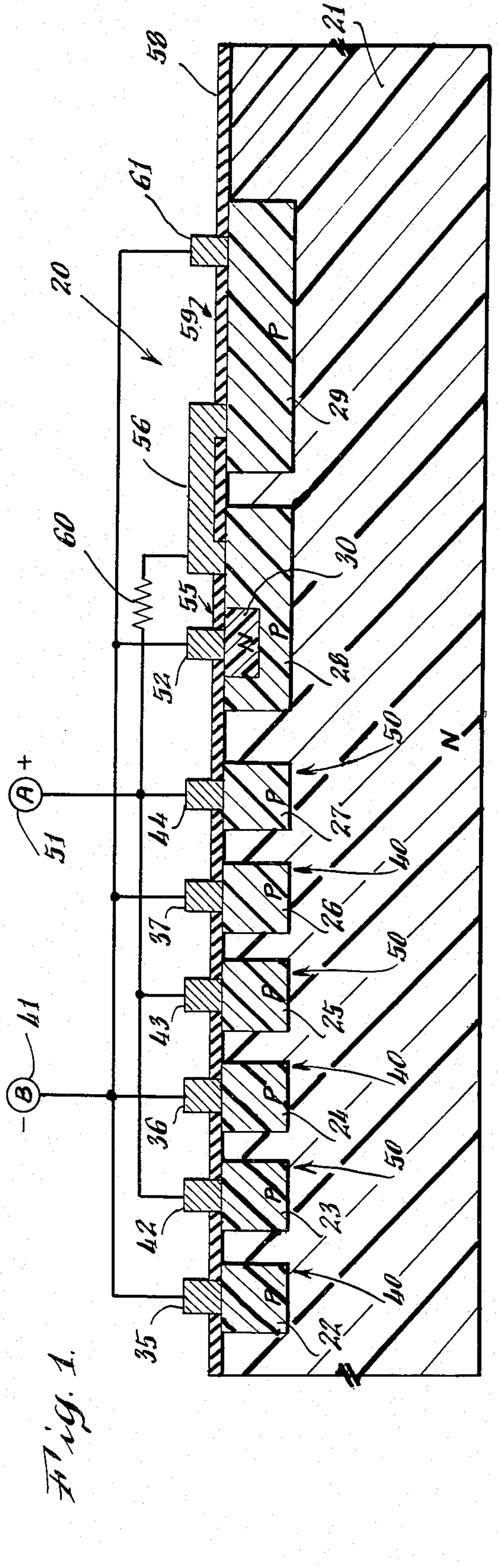
FIG. 1 is partially a cross sectional representation and partially a schematic representation of the device in accordance with the present invention.
Figure 2:
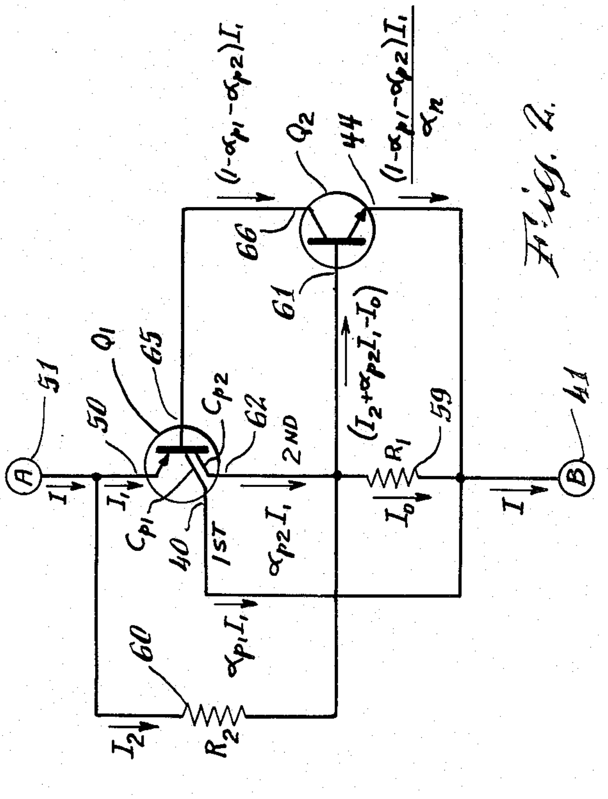
FIG. 2 is a schematic diagram showing the device of FIG. 1.

Referring now to FIGS. 1 and 2, there is shown a module 20 in accordance with the present invention. The module is fabricated in an n-type silicon substrate 21 which has formed therein the p-type segments: 22, 23, 24, 25, 26, and 27; and regions 28 and 29. An n-type region 30 is formed within the region 28. The recited regions can be made by methods well known in the art, for example, by selective diffusion of impurities into the substrate 21. Metal electrodes 35, 36 and 37 are formed in contact with segments 22, 24 and 26 to collectively form the first collector region 40 of the PNP type transistor $Q_1$. These electrodes are electrically connected together and connected to a terminal point 41. Metal electrodes 42, 43 and 44 are formed in contact with segments 23, 25 and 27. These segments collectively form the emitter region 50 of the PNP transistor and are electrically connected together as well as to the input terminal 51. Another metal electrode 52 is formed in contact with region 30 and forms the emitter of the NPN type transistor 55. Further metal electrodes 56 are formed in contact with region 28 and 29 and interconnects both 28 and 29, region 29 being a base diffuse resistor. Electrode 61 contacts region 29 to form the second base resistor contact. These electrodes can be made, as is well known, by deposition of a suitable metal, such as aluminum through apertures etched in an insulating layer 58 which is formed over the substrate 21. The insulating layer 58 may be, for example, silicon dioxide, which can be conveniently grown on a silicon surface by heating in an oxygen atmosphere.

The regions 40, 50, and 28, together with substrate 21 may be considered as comprising a double collector PNP transistor $Q_1$. The regions 28 and 30, together with substrate 21, may be considered as comprising an NPN transistor $Q_2$. The region 29 as hereinbefore indicated is an optional base diffused resistive element 59. A second resistive element 60 is electrically connected between input terminal 51 and electrode 56.

The linear arrangement of the various regions in the substrate as shown in FIG. 1 is given by way of example only. Other geometrical arrangements, such as circular, known to those skilled in the art, may also be used. The number and distribution of regions used as one of the collectors in the PNP transistor and the emitter in the PNP transistor is a function of the desired design characteristics of the device which is discussed herinafter.

As shown in FIG. 2, the input terminal 51 is connected to resistor 60 and emitter 50 of PNP transistor $Q_1$. Resistor 60 is connected to the base 61 of the NPN transistor Q2 and to the second collector 62 of transistor $Q_1$ as well as to resistor 59. Resistor 59 is electrically connected to the output terminal 41 and emitter 44 of transistor $Q_2$ and the first collector 40 of $Q_1$. The base 65 of transistor $Q_1$ is in common and electrically connected to the collector 66 of transistor $Q_2$, represented by region 28 in FIG. 1.

When a voltage is applied to the device shown in FIGS. 1 and 2 with terminal 51 positive with respect to terminal 41, a current, I, limited by the resistors 59 and 60 will flow. If this current is increased to a value $I_1$, where $$I_1 = V_{be\ (NPN)}/R_1 \quad (1)$$

the NPN transistor $Q_2$ will begin to conduct. The NPN collector current is the base drive for the PNP transistor $Q_1$ which will also start to conduct. Since the second collector 62 of $Q_1$ is in a regenerative loop with $Q_2$, the device will begin to exhibit a negative incremental resistance. This means that a further increase in current, I, results in a decrease of the terminal voltage $V_{AB}$. At some higher value of I, the current through the second collector 62 of transistor $Q_1$ will be sufficient to drive the NPN transistor $Q_2$ into saturation and the device will again exhibit a positive resistance characteristic. The voltage versus current characteristics of this device are graphically shown in FIG. 3 where the voltage and current in milliamperes (ma) is measured between the input and output terminals 41 and 51.

In normal operation, the device is biased with a current, $I_B$, such that $$I_1 < I_B < I_2 \quad (2)$$

This biases the device in the negative resistance region. The magnitude of the negative resistance has been derived as $$R = R_2 \left[1 - \frac{\alpha_n}{(1 + \alpha_{p1}\alpha_n - \alpha_{p1} - \alpha_{p2})}\right] \quad (3)$$

where $\alpha_{p1}$ is the current gain for collector 1 of transistor $Q_1$, $\alpha_{p2}$ is the current gain for collector 2 of the transistor $Q_1$, and $\alpha_n$ is the current gain for transistor $Q_2$. In these devices $\alpha_n$ is the current gain for transistor $Q_2$. In these devices $\alpha_n$ is preferably very nearly unity and therefore $$R = R_2 \left[1 - \frac{1}{1 - \alpha_{p2}}\right] \quad (4)$$

The ratio of $\alpha_{p1}$ to $\alpha_{p2}$ is controlled by the device geometry; that is, the surface area of the collector region which in the lateral structure shown in FIG. 1 is the length ratio of segments 22, 24, and 26 to region 28. The multiple emitter segments 23, 25 and 27 of $Q_1$ are interleaved with the first collector segments 23, 25, and 27 to obtain the proper interaction. This $\alpha$ ratio which is a critical parameter, is controlled by the mask making process which is capable of providing the necessary precision.

Figure 3:
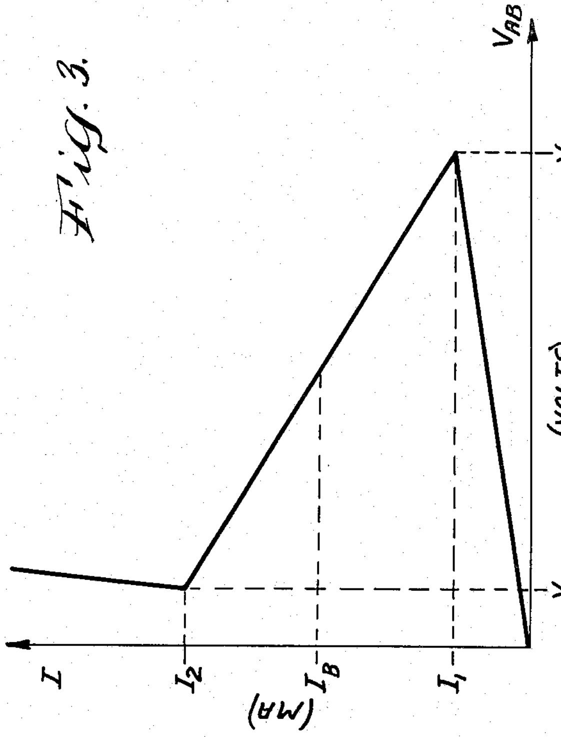
FIG. 3 is a graphical representation of the voltage versus current characteristics of the device shown in FIG. 1.

The boundary points defining the negative resistance region are shown in FIG. 3.

$$V_1 = \frac{(R_1 + R_2)\ V_{be}(npn)}{R_1} \quad (5)$$

$$I_1 = \frac{V_{be}(npn)}{R_1} \quad (6)$$

$$V_2 \, c \; 1 \text{ volt} \tag{7}$$

$$I_2 - \frac{V_{be}(npn)}{\alpha_{p2}R} = \frac{I_1}{\alpha_{p2}} \tag{8}$$

An operative embodiment of the device shown in FIG. 1 has been constructed utilizing the following circuit parameters:

| | | |
|---|---|---|
| resistor 59 | — | 400 Ω |
| resistor 60 | — | 700 Ω |
| bias current | — | 1.9 milliamperes |
| bias voltage | — | 1.4 volts |

$$\frac{\alpha_{p1}}{\alpha_{p2}} = 9$$

$$\alpha_n \approx 1$$

1

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

What is claimed is:

1. A semiconductor circuit module for a negative impedance converter having input and output terminals, which comprises:

a. a semiconductor substrate of a first conductivity type;

b. a first bipolar transistor having a base of a first conductivity type which is said substrate, a first collector and an emitter of a second conductivity type in a first and second region of continuous volume formed by diffusion in said substrate and extending to the surface thereof, and a second collector of a second conductivity type in a third region formed by diffusion in said substrate and extending to the surface thereof;

c. a second bipolar transistor having a collector of the first conductivity type which is said substrate, a base of the second conductivity type which is said third region, an emitter of the first conductivity type, said emitter comprising a fourth diffused region formed within said third region and extending to the surface thereof; and d. first, second, third and fourth spaced electrodes conductively contacting said first, second, third and fourth regions respectively, said second electrode is coupled to said input terminal and said first electrode is coupled to said output terminal.

2. A circuit module as defined by claim 1 which further comprises a resistor of a second conductivity type in a fifth region formed by diffusion in said substrate and extending to the surface thereof, and a fifth and sixth electrode conductively contacting on opposed sides of said fifth region, said fifth electrode being coupled to said third electrode.

3. A negative impedance converter circuit having input and output terminals comprising:

a first transistor having a base, emitter, and collector;

a second transistor of an opposite conductivity type as the first transistor and having two collectors, a base and an emitter, the base of said second transistor coupled to the collector of the first transistor;

a first resistor coupled at one end to said input terminal and the emitter of the second transistor, the other end of said first resistor coupled to the base of the first transistor and one of the collectors of the second transistor;

a second resistor coupled at one end to the base of the first transistor and the other end coupled to the output terminal, the emitter of the first transistor and the other collector of the second transistor;

said first transistor being biased in a conducting condition in response to a dc voltage at the input terminal being positive with respect to the output terminal, thereby causing current flow from the collector to the emitter of the first transistor;

said second transistor being biased in a conducting condition in response to the current flowing from the base to the common collector of the first transistor, whereby a regenerative loop is established between one collector of the second transistor and the base of the first transistor; and said second transistor thereupon being operative in response to the increase in current at its base to conduct more heavily through its other collector causing the voltage between the terminals to decrease, whereby the output of the circuit will exhibit a negative impedance.

4. A semiconductor circuit module for a negative impedance converter having input and output terminals, which comprises:

a. a semiconductor substrate of a first conductivity type;

b. a first transistor having a base of a first conductivity type which is said substrate, a first collector and an emitter of a second conductivity type in a first and second region formed by diffusion in said substrate and extending to the surface thereof, and a second collector of a second conductivity type in a third region formed by diffusion in said substrate and extending to the surface thereof;

c. a second transistor having a collector of the first conductivity type which is said substrate, a base of the second conductivity type which is said third region, an emitter of the first conductivity type, said emitter comprising a fourth diffused region formed within said third region and extending to the surface thereof;

d. first, second, third and fourth spaced electrodes conductively contacting said first, second, third and fourth regions respectively, said second electrode is coupled to said input terminal and said first electrode is coupled to said output terminal;

e. a resistor of a second conductivity type in a fifth region formed by diffusion in said substrate and extending to the surface thereof, and a fifth and sixth electrode conductively contacting on opposed sides of said fifth region, said fifth electrode being coupled to said third electrode; and f. resistive means coupling said second and third electrodes.

5. A circuit module as defined by claim 4 wherein said first electrode is coupled to both said fourth electrode and said sixth electrode.

* * * * *